(12) United States Patent
Hashimoto et al.

(10) Patent No.: US 10,174,676 B2
(45) Date of Patent: Jan. 8, 2019

(54) ROTARY MACHINE, METHOD OF ASSEMBLING ROTARY MACHINE, AND METHOD OF PERFORMING MAINTENANCE OF ROTARY MACHINE

(71) Applicant: MITSUBISHI HITACHI POWER SYSTEMS, LTD., Kanagawa (JP)

(72) Inventors: Shinya Hashimoto, Kanagawa (JP); Takuro Kameda, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/313,392

(22) PCT Filed: Apr. 9, 2015

(86) PCT No.: PCT/JP2015/061163
§ 371 (c)(1),
(2) Date: Nov. 22, 2016

(87) PCT Pub. No.: WO2015/190169
PCT Pub. Date: Dec. 17, 2015

(65) Prior Publication Data
US 2017/0184031 A1 Jun. 29, 2017

(30) Foreign Application Priority Data
Jun. 9, 2014 (JP) .................. 2014-118815

(51) Int. Cl.
*F02C 7/20* (2006.01)
*F01D 25/26* (2006.01)
(Continued)

(52) U.S. Cl.
CPC .............. *F02C 7/20* (2013.01); *F01D 25/243* (2013.01); *F01D 25/26* (2013.01); *F01D 25/28* (2013.01);
(Continued)

(58) Field of Classification Search
CPC ...................... F05D 2260/30; F05D 2230/644
See application file for complete search history.

(56) References Cited

U.S. PATENT DOCUMENTS

| 4,112,582 A * | 9/1978 | Beckershoff | ............ F01D 25/24 33/655 |
| 4,650,396 A * | 3/1987 | Schwarz | ............... F01D 25/243 403/374.3 |

(Continued)

FOREIGN PATENT DOCUMENTS

| JP | 63-259110 | 10/1988 |
| JP | 4-113756 | 4/1992 |

(Continued)

OTHER PUBLICATIONS

Written Opinion of the International Searching Authority dated Jul. 14, 2015 in corresponding International (PCT) Application No. PCT/JP2015/061163.
(Continued)

*Primary Examiner* — Andrew Nguyen
*Assistant Examiner* — Stephanie Cheng
(74) *Attorney, Agent, or Firm* — Wenderoth, Lind & Ponack, L.L.P.

(57) ABSTRACT

In a rotary machine, a method of assembling a rotary machine, and a method of performing maintenance of a rotary machine, a combustor casing as an outer casing configured from upper and lower casings defining a half split shape, an intermediate shaft cover as an inner casing configured from upper and lower casings defining a half split shape and supporting a combustor in the combustor casing, and a pressing support mechanism configured to press and support a portion to be fit of the combustor casing and a fitting portion of the intermediate shaft cover in an axial direction of a rotor are included.

12 Claims, 9 Drawing Sheets

(51) Int. Cl.
- *F01D 25/28* (2006.01)
- *F23R 3/60* (2006.01)
- *F02C 7/00* (2006.01)
- *F02C 7/36* (2006.01)
- *F01D 25/24* (2006.01)

(52) U.S. Cl.
CPC ............ *F02C 7/36* (2013.01); *F23R 3/60* (2013.01); *F02C 7/00* (2013.01); *F05D 2230/72* (2013.01); *F05D 2260/31* (2013.01); *F05D 2260/941* (2013.01); *F23R 2900/00019* (2013.01)

(56) References Cited

U.S. PATENT DOCUMENTS

| | | | |
|---|---|---|---|
| 4,734,009 A | 3/1988 | Campbell et al. | |
| 5,772,252 A * | 6/1998 | Malani | F16B 31/021 285/337 |
| 8,568,094 B2 * | 10/2013 | Arase | F01D 25/243 415/213.1 |
| 9,611,759 B2 * | 4/2017 | Adaickalasamy | F01D 25/24 |
| 2003/0118399 A1 * | 6/2003 | Schilling | F16B 5/0275 403/337 |
| 2005/0044685 A1 | 3/2005 | Brooks et al. | |
| 2007/0041833 A1 * | 2/2007 | Dupin | F01D 25/265 415/214.1 |
| 2008/0003102 A1 | 1/2008 | Peel | |
| 2010/0296926 A1 | 11/2010 | Arase et al. | |
| 2012/0121391 A1 | 5/2012 | Burdgick et al. | |
| 2013/0230392 A1 | 9/2013 | Hashimoto | |

FOREIGN PATENT DOCUMENTS

| | | |
|---|---|---|
| JP | 2002-161712 | 6/2002 |
| JP | 2005-76633 | 3/2005 |
| JP | 2008-14311 | 1/2008 |
| JP | 2012-62900 | 3/2012 |
| JP | 2012-107622 | 6/2012 |
| JP | 2013-181503 | 9/2013 |
| KR | 10-2010-0117088 | 11/2010 |
| WO | 2010/016141 | 2/2010 |

OTHER PUBLICATIONS

International Search Report dated Jul. 14, 201 in International (PCT) Application No. PCT/JP2015/061163.

Decision of a Patent Grant dated Dec. 8, 2015 in Japanese Application No. 2014-118815, with English translation.

Office Action dated Nov. 12, 2017 in Korean Patent Application No. 10-2016-7032646, with English translation.

* cited by examiner

ROTARY MACHINE, METHOD OF ASSEMBLING ROTARY MACHINE, AND METHOD OF PERFORMING MAINTENANCE OF ROTARY MACHINE

FIELD

The present invention relates to a rotary machine such as a gas turbine or a steam turbine, a method of assembling a rotary machine, and a method of performing maintenance of a rotary machine.

BACKGROUND

A typical gas turbine is configured from a compressor, a combustor, and a turbine, for example. The compressor compresses air taken in through an air intake into high-temperature and high-pressure compressed air. The combustor supplies a fuel to the compressed air to burn the fuel and the compressed air and obtains a high-temperature and high-pressure combustion gas. The turbine is driven by the combustion gas, and drives a coaxially-connected generator.

In the gas turbine, the combustor is supported by an intermediate shaft cover, and an outer peripheral edge portion of the intermediate shaft cover is fit into a fitting portion of an upper casing, and fixed with bolts. Therefore, when performing maintenance of the combustor, an operator separates the intermediate shaft cover and the upper casing by loosening and removing the bolts, and detaches the upper casing and exposes the combustor. An example of such a gas turbine is described in Japanese Patent Publication No. 2012-062900 A.

TECHNICAL PROBLEM

In the above-described conventional gas turbine, the outer peripheral edge portion of the intermediate shaft cover, which supports the combustor, is fit into the fitting portion of the upper casing and fixed with the bolts. At the time of the maintenance of the combustor, the bolts are loosened and the upper casing is detached. However, a portion fastened with the bolt of the intermediate shaft cover and the upper casing reaches high temperature in operation of the gas turbine and a screw portion of the bolt seizes, and it becomes difficult to loosen the bolt, which poses a problem for the maintenance of the combustor.

SUMMARY

The present invention solves the above-described problem, and an objective is to provide a rotary machine, a method of assembling a rotary machine, and a method of performing maintenance of a rotary machine, which enable easy detachment of a casing and improve maintainability of an inside thereof.

SOLUTION TO PROBLEM

A rotary machine of the present invention for achieving the above-described objective in which a rotation body is rotatably supported in a casing includes: an outer casing configured from upper and lower outer casing portions forming a half split shape; an inner casing configured from upper and lower inner casing portions forming a half split shape, and installed inside the outer casing; and a pressing support mechanism configured to press and support radial-direction fitting portions of the outer casing and the inner casing in a shaft center direction of the rotation body.

Therefore, the outer casing and the inner casing installed inside the outer casing are pressed and supported in the shaft center direction by the pressing support mechanism, and thus there is no screw engaging portion between the outer casing and the inner casing, and seizure of a screw portion can be avoided. Therefore, by simply cancelling the pressing between the outer casing and the inner casing by the pressing support mechanism, the outer casing can be detached from the inner casing. Further, even if the pressing between the outer casing and the inner casing by the pressing support mechanism cannot be cancelled, the outer casing can be detached without cancelling the pressing between the outer casing and the inner casing, by causing a load to act on the outer casing outward in the radial direction. As a result, detachment of the casing becomes easy, and maintainability of an internal structure can be improved.

In the rotary machine of the present invention, the pressing support mechanism includes a support pad that is screwed and engaged with one of the fitting portion of the outer casing and the fitting portion of the inner casing, and presses the other of the fitting portion of the outer casing and the fitting portion of the inner casing.

Therefore, by simply rotating the support pad, the press support between the outer casing and the inner casing by the support pad can be provided or the pressing therebetween can be cancelled, and workability of assembling work and disassembling work of the outer casing can be improved.

In the rotary machine of the present invention, the fitting portion of the outer casing forms a recess shape, the fitting portion of the inner casing forms a protrusion shape, and the support pad is screwed and engaged with the fitting portion of the inner casing.

Therefore, by simply rotating the support pad when the fitting portion forming a protrusion shape of the inner casing is fit into the fitting portion forming a recess shape of the outer casing, the press support against the outer casing can be provided or the pressing against the outer casing can be cancelled, and the workability can be improved.

In the rotary machine of the present invention, a rotation stop mechanism that prevents rotation of the support pad is provided.

Therefore, after the support pad is rotated, and the outer casing and the inner casing are pressed and supported, the rotation of the support pad is prevented by the rotation stop mechanism, and thus cancellation of the press support between the outer casing and the inner casing due to vibration and the like is suppressed.

In the rotary machine of the present invention, the rotation stop mechanism includes a locking member that is locked into a base end portion of the support pad, and a fixing member that fixes the locking member to the outer casing or the inner casing.

Therefore, after the support pad is rotated, and the outer casing and the inner casing are pressed and supported, the locking member is locked into the base end portion of the support pad, and the locking member is fixed to the outer casing or the inner casing with the fixing member. Therefore, the rotation of the support pad can be easily prevented with a simple configuration, and when seizure of the fixing member occurs, the locking member can be detached by eliminating the fixing member.

In the rotary machine of the present invention, a centering mechanism that supports the inner casing so as to be movable with respect to the outer casing in a radial direction is provided.

Therefore, the inner casing is movable with respect to the outer casing in the radial direction by the centering mechanism, and thus even if thermal elongation of the outer casing and the inner casing occurs, centers of the casings are not misaligned.

A method of assembling a rotary machine of the present invention in which a rotating shaft is rotatably supported, through a bearing, in a casing forming a shape split into upper and lower halves, and an inner casing is provided inside the casing and on an outer peripheral side of the rotating shaft includes the processes of fitting an upper casing of the casing onto an end portion of the inner casing in a radial direction, and pressing and supporting a fitting portion between the casing and the inner casing in a shaft center direction of the rotating shaft by a support pad.

Therefore, the upper casing and the inner casing are pressed and supported in the shaft center direction by the support pad, and thus by simply cancelling the pressing between the upper casing and the inner casing by the support pad, the upper casing can be detached from the inner casing. Further, even if the pressing between the upper casing and the inner casing by the support pad cannot be cancelled, the pressing between the upper casing and the inner casing can be cancelled and the upper casing can be detached, by causing a load to act on the upper casing outward in the radial direction. As a result, detachment of the casing becomes easy, and the maintainability of the combustors can be improved.

In the method of assembling a rotary machine of the present invention, the support pad is screwed and engaged with one of the upper casing and the inner casing, and presses the other of the upper casing and the inner casing by being rotated when the upper casing is fit onto the end portion of the inner casing.

Therefore, by simply rotating the support pad, the press support between the upper casing and the inner casing by the support pad can be provided or the pressing therebetween can be cancelled, and the workability of assembling work and disassembling work of the upper casing can be improved.

In the method of assembling a rotary machine of the present invention, after the upper casing and the intermediate shaft cover are pressed and supported by the support pad, rotation of the support pad with respect to the upper casing and the intermediate shaft cover is prevented.

Therefore, cancellation of the press support between the upper casing and the inner casing due to vibration and the like is suppressed.

A method of performing maintenance of a rotary machine of the present invention in which a rotating shaft is rotatably supported, through a bearing, in a casing forming a shape split into upper and lower halves, and an inner casing is provided inside the casing and on an outer peripheral side of the rotating shaft includes the processes of cancelling fastening between an upper casing and a lower casing of the casing, raising and detaching the upper casing from the lower casing, performing maintenance of an inside of the casing, fitting the upper casing onto an end portion of the inner casing in a radial direction, pressing and supporting a fitting portion between the upper casing and the inner casing in a shaft center direction of the rotating shaft by a support pad, and fastening the upper casing to the lower casing.

Therefore, the upper casing and the inner casing are pressed and supported in the shaft center direction by the support pad, and thus by simply cancelling the pressing between the upper casing and the inner casing by the support pad, the upper casing can be detached from the inner casing. Further, even if the pressing between the upper casing and the inner casing by the support pad cannot be cancelled, the pressing between the upper casing and the inner casing can be cancelled and the upper casing can be detached, by causing a load to act on the upper casing outward in the radial direction. As a result, detachment of the casing becomes easy, and the maintainability of the combustors can be improved.

ADVANTAGEOUS EFFECTS OF INVENTION

According to the rotary machine, the method of assembling a rotary machine, and the method of performing maintenance of a rotary machine of the present invention, the upper casing and the inner casing are pressed and supported in the shaft center direction by the pressing support mechanism (support pad). Therefore, detachment of the casing becomes easy, and the maintainability of the internal structure (combustors) can be improved.

DESCRIPTION OF EMBODIMENTS

Hereinafter, a favorable embodiment of a rotary machine, a method of assembling a rotary machine, and a method of performing maintenance of a rotary machine according to the present invention will be described with reference to the attached drawings. Note that the present invention is not limited by the embodiment, and in a case where there is a plurality of embodiments, the present invention includes configurations of combinations of the embodiments.

Figure 14:
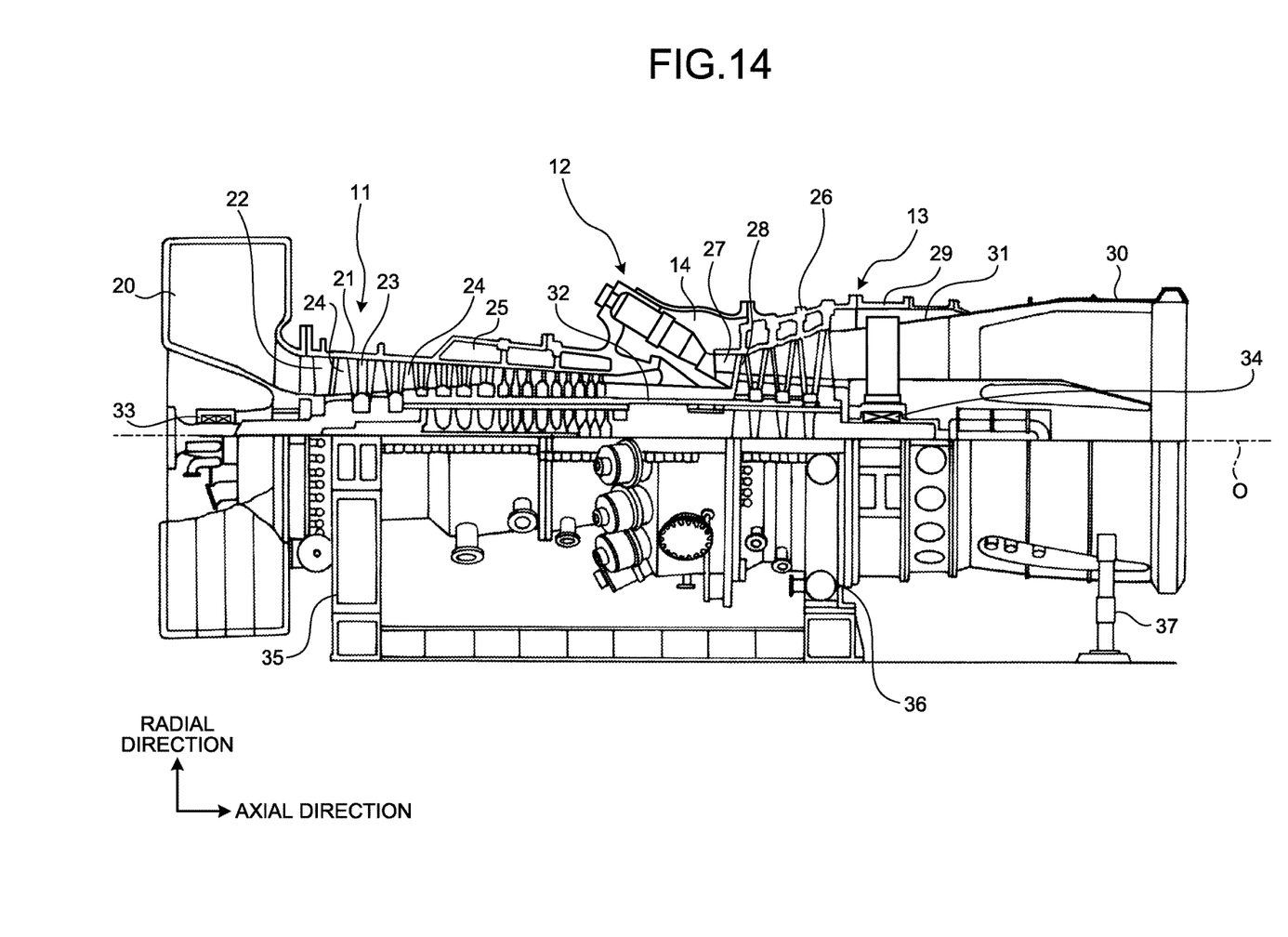
FIG. 14 is a schematic view illustrating an overall configuration of a gas turbine.

FIG. 14 is a schematic view illustrating an overall configuration of a gas turbine of the present embodiment.

The gas turbine of the present embodiment is configured from, as illustrated in FIG. 14, a compressor 11, a combustor 12, and a turbine 13. In this gas turbine, the compressor 11 and the turbine 13 are arranged outside a rotating shaft 32 along a direction of a shaft center O, and a plurality of combustors 12 is arranged between the compressor 11 and the turbine 13. Then, the gas turbine is coaxially connected with a generator (motor, not illustrated), and can generate electricity.

The compressor 11 includes an air intake 20 through which air is taken in. In a compressor casing 21, an inlet guide vane (IGV) 22 is arranged, and a plurality of vanes 23 and a plurality of blades 24 are alternately arranged in a flow direction of the air (in a direction of the shaft center O of a rotor 32 described below). A bleed air chamber 25 is provided outside the compressor casing 21. The compressor 11 compresses the air taken in through the air intake 20 to generate high-temperature and high-pressure compressed air, and supplies the compressed air to a casing 14. The compressor 11 is driven by a coaxially connected motor.

The combustors 12 are supplied with the high-temperature and high-pressure compressed air compressed in the compressor 11 and stored in the casing 14, and a fuel, and burn the compressed air and the fuel to generate a combustion gas. In the turbine 13, a plurality of vanes 27 and a plurality of blades 28 are alternately arranged in a turbine casing 26 in a flow direction of the combustion gas (the direction of the shaft center O of the rotor 32). Then, a flue gas chamber 30 is arranged on a downstream side of the turbine casing 26 through a flue gas casing 29. The flue gas chamber 30 includes a flue gas diffuser 31 connected to the turbine 13. The turbine 13 is driven by the combustion gas from the combustors 12, and drives the coaxially connected generator.

In the compressor 11, the combustors 12, and the turbine 13, the rotor (rotating shaft) 32 along the direction of the shaft center O is arranged to penetrate a central portion of the flue gas chamber 30. An end portion of the rotor 32 on the compressor 11 side is rotatably supported by a bearing 33, and an end portion on the flue gas chamber 30 side is rotatably supported by a bearing 34. Then, a plurality of disks to which the blades 24 are mounted is layered and fixed to the rotor 32 in the compressor 11. Further, a plurality of disks to which the blades 28 are mounted is layered and fixed to the rotor 32 in the turbine 13. A drive shaft of the generator is connected to an end portion of the rotor 32 on the air intake 20 side.

Then, in the gas turbine, the compressor casing 21 of the compressor 11 is supported by a leg portion 35, the turbine casing 26 of the turbine 13 is supported by a leg portion 36, and the flue gas chamber 30 is supported by a leg portion 37.

In the compressor 11, the air taken in through the air intake 20 passes through the inlet guide vane 22 and the plurality of vanes 23 and blades 24 and is compressed to become the high-temperature and high-pressure compressed air. In the combustors 12, a predetermined fuel is supplied to the compressed air and is burned. In the turbine, the high-temperature and high-pressure combustion gas generated in the combustors 12 passes through the plurality of vanes 27 and blades 28 in the turbine 13 to drive and rotate the rotor 32, and drives the generator connected to the rotor 32. Then, the combustion gas that has driven the turbine 13 is released to the atmosphere as a flue gas.

In the gas turbine configured as described above, the plurality of combustors 12 is arranged between the compressor 11 and the turbine 13 at predetermined intervals in a peripheral direction. Then, each of the combustors 12 is supported outside an intermediate shaft cover, and an outer peripheral edge portion of the intermediate shaft cover is connected to a combustor casing. Therefore, when maintenance of the combustor is performed, fastening of the combustor casing is cancelled, and connection of the combustor casing with the intermediate shaft cover is cancelled, then the combustor casing is detached, and maintenance work of the combustor is performed.

Figure 1:
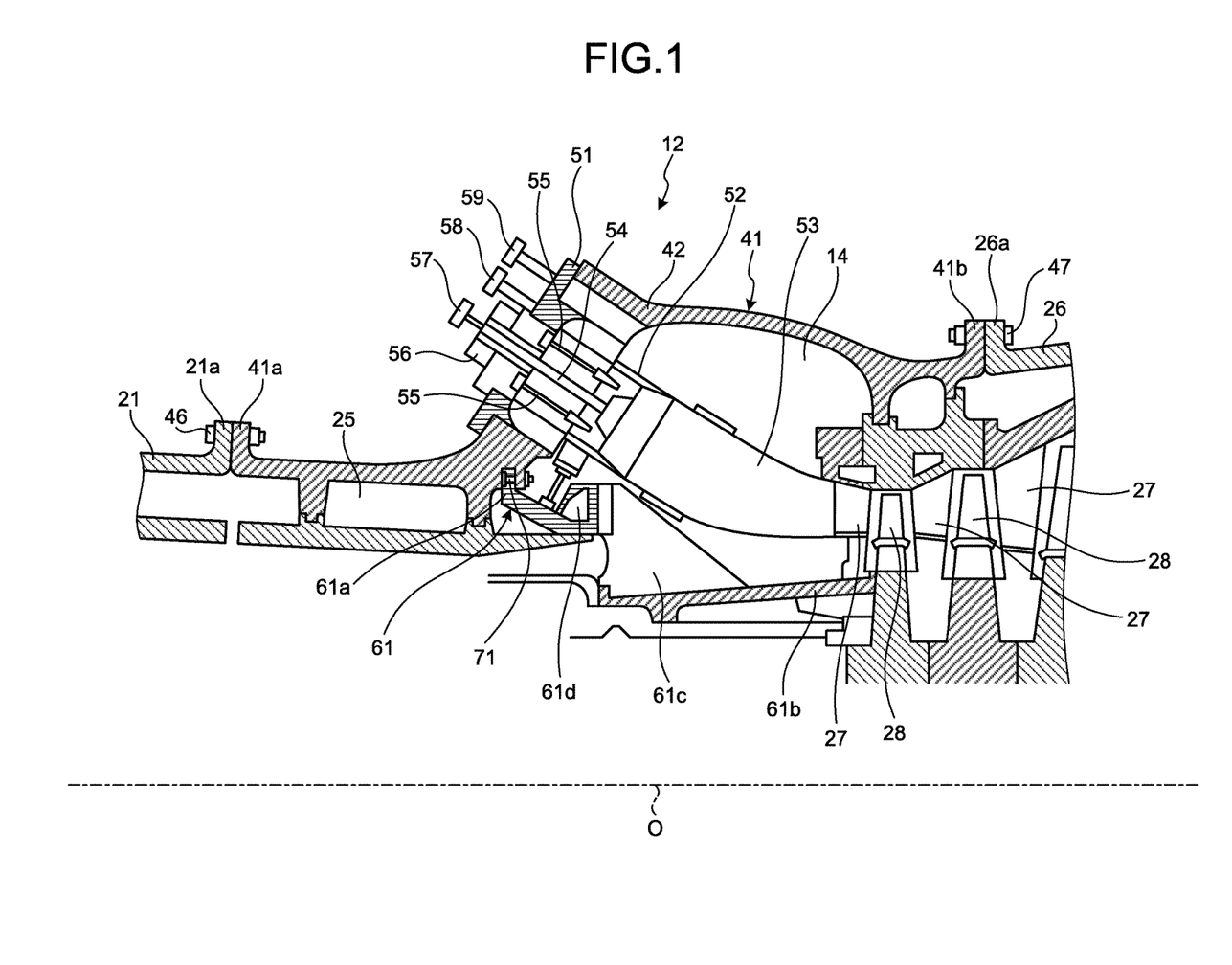
FIG. 1 is a sectional view illustrating a vicinity of a combustor in a gas turbine of the present embodiment.
Figure 2:
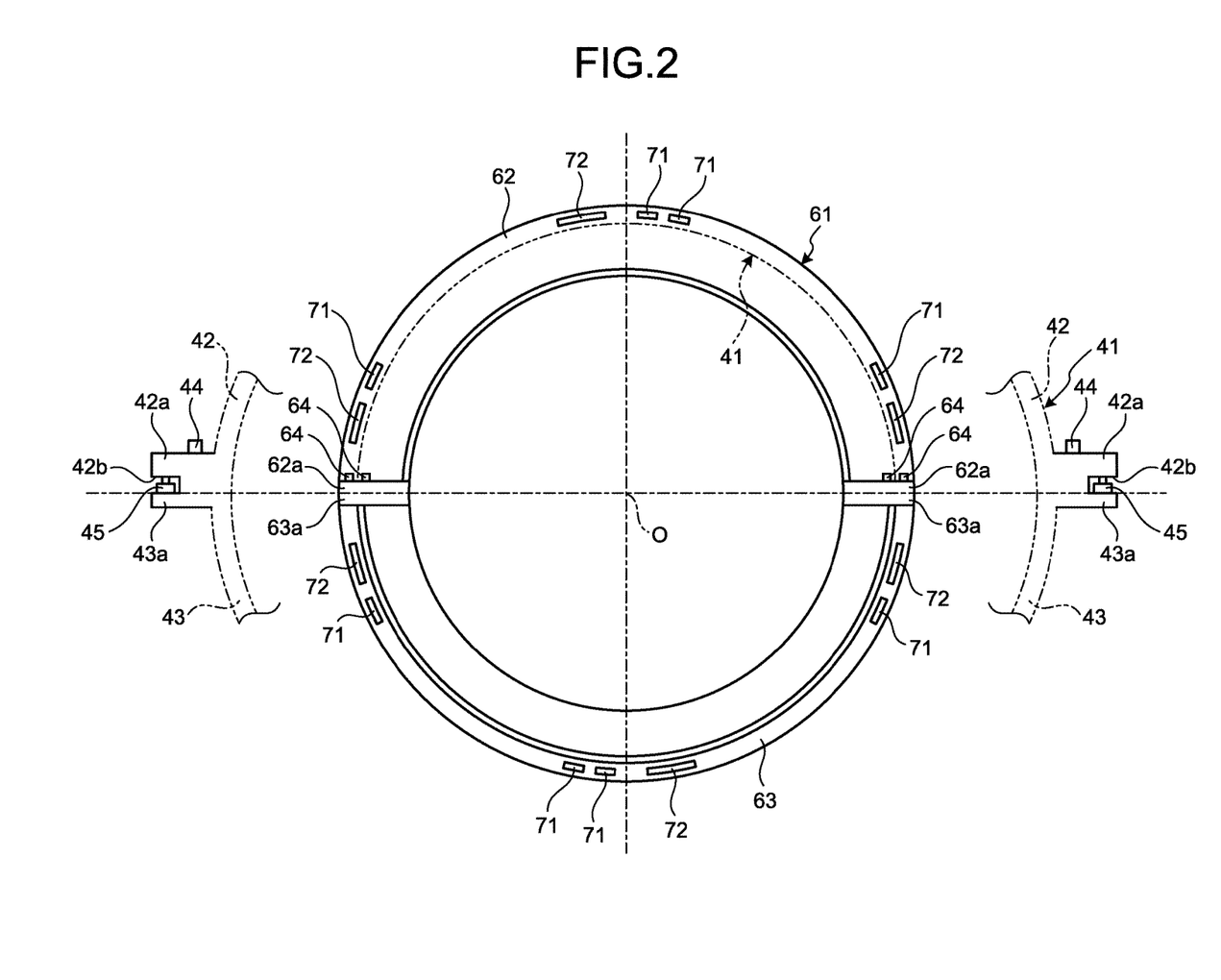
FIG. 2 is a front view illustrating an intermediate shaft cover.
Figure 3:
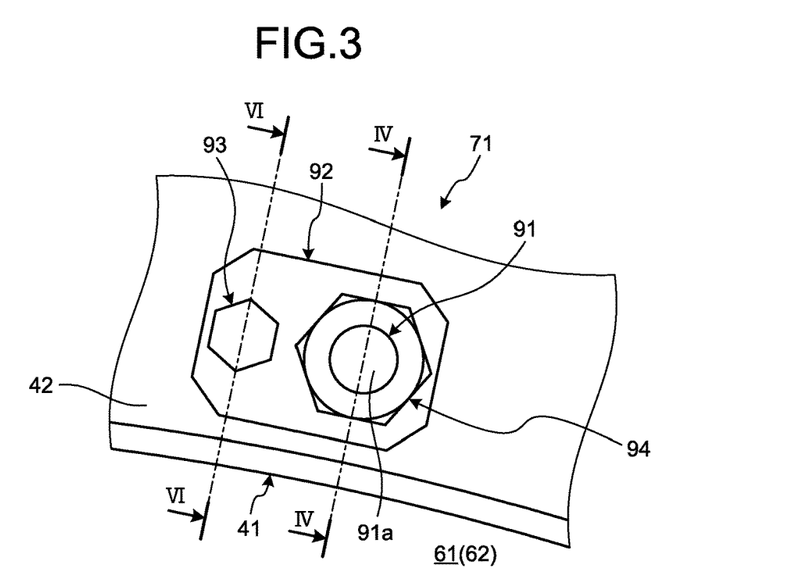
FIG. 3 is a front view illustrating a portion of the intermediate shaft cover attached with a support pad.
Figure 4:
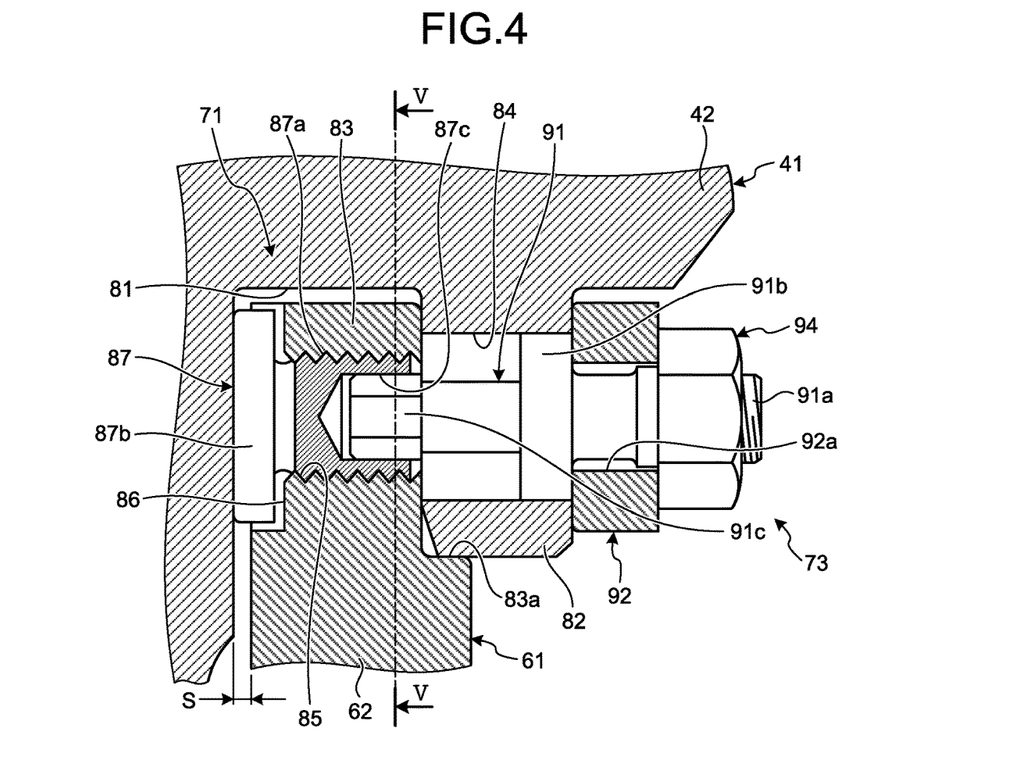
FIG. 4 is a IV-IV section view of FIG. 3, illustrating the portion of the intermediate shaft cover attached with the support pad.
Figure 5:
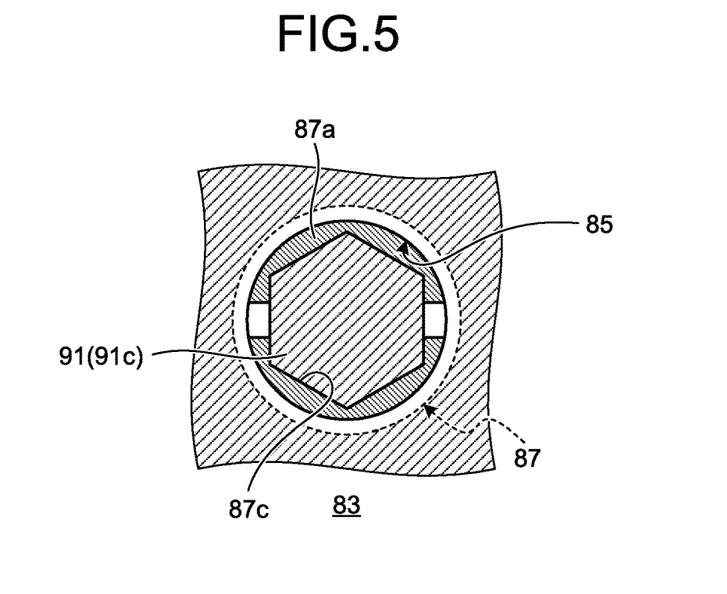
FIG. 5 is a V-V section view of FIG. 4.
Figure 6:
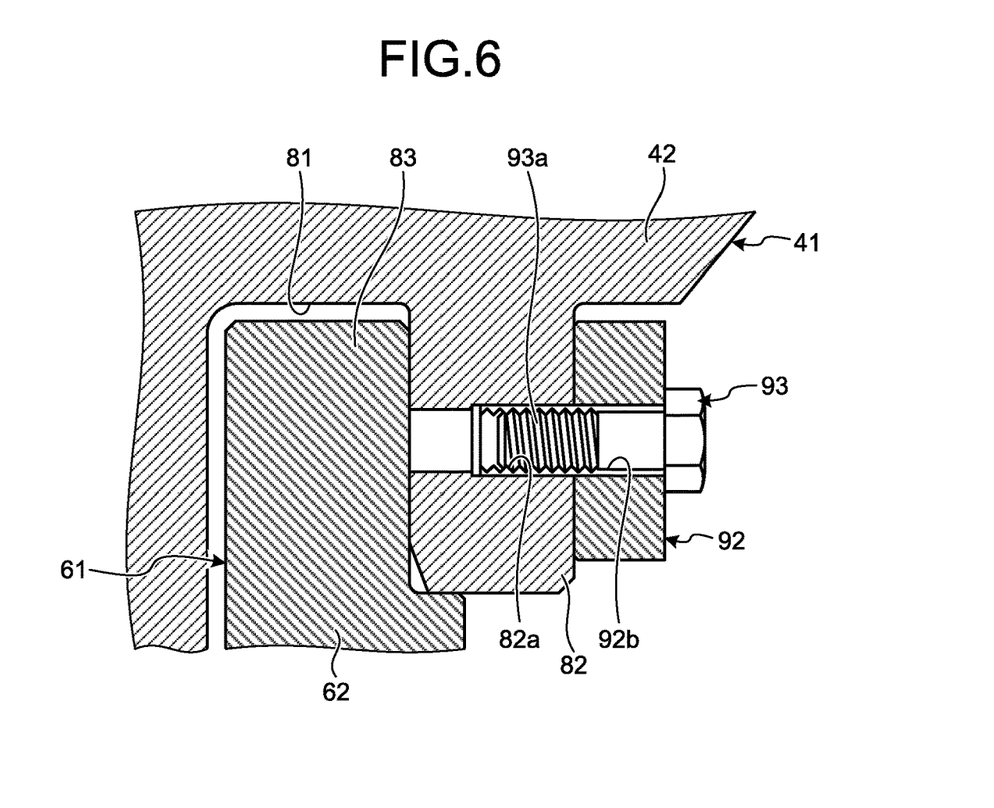
FIG. 6 is a VI-VI section view of FIG. 3.

FIG. 1 is a sectional view illustrating a vicinity of a combustor in the gas turbine of the present embodiment, FIG. 2 is a front view illustrating the intermediate shaft cover, FIG. 3 is a front view illustrating a portion of the intermediate shaft cover attached with a support pad, FIG. 4 is a IV-IV section view of FIG. 3, illustrating the portion of the intermediate shaft cover attached with the support pad, FIG. 5 is a V-V section view of FIG. 4, and FIG. 6 is a VI-VI section view of FIG. 3.

As illustrated in FIGS. 1 and 2, a combustor casing (outer casing) 41 has a cylindrical shape along the direction of the shaft center O of the rotor 32 (see FIG. 14). The combustor casing 41 is configured from an upper casing (outer casing portion) 42 and a lower casing (outer casing portion) 43 forming a half split shape, and right and left outer peripheral flange portions 42a and 43a are closely in contact in an up and down direction and are integrally connected with a plurality of bolts 44. Then, a notch portion 42b is formed in the outer peripheral flange portion 42a of the upper casing 42, and a jack (lift device) 45 can be arranged therein.

Further, in the combustor casing 41, an attaching flange 41a is formed on one side in the direction of the shaft center O, and an attaching flange 41b is formed on the other side. Then, the combustor casing 41 has the attaching flange 41a closely in contact with an attaching flange 21a of the compressor casing 21 and connected to the compressor casing 21 with a bolt 46, and has the attaching flange 41b closely in contact with an attaching flange 26a of the turbine casing 26 and connected to the turbine casing 26 with a bolt 47.

The plurality of combustors 12 is attached to the combustor casing 41 at predetermined intervals in the peripheral direction. A combustor external cylinder 51 is arranged in an attaching hole formed in the combustor casing 41. A combustor basket 52 is supported inside the combustor external cylinder 51 with a predetermined interval, and a combustor transition piece 53 is connected to a tip end portion of the combustor basket 52. A pilot combustion burner 54 is arranged in the center inside the combustor basket 52, and a plurality of main combustion burners 55 is arranged on an inner peripheral surface of the combustor basket 52 to surround the pilot combustion burner 54 along the peripheral direction. Further, a tip end portion of the combustor transition piece 53 is connected to the turbine vanes 27.

Further, a top hat portion 56 is fit in the combustor external cylinder 51, and is fastened with a plurality of fastening bolts (illustration is omitted), and the top hat portion 56 is provided with fuel ports 57, 58, and 59. Then, a pilot fuel line (not illustrated) is connected to the fuel port 57 of the pilot combustion burner 54, main combustion lines (not illustrated) are connected to the fuel ports 58 of the main combustion burners 55, and a top hat combustion line (not illustrated) is connected to the fuel port 59.

Therefore, an air flow of the high-temperature and high-pressure compressed air flows into the combustor basket 52, and the compressed air is mixed with the fuel injected from the main combustion burners 55 in the combustor basket 52, and becomes a swirling flow of a pre-mixed gas and flows into the combustor transition piece 53. Further, the compressed air is mixed with the fuel injected from the pilot combustion burner 54, is burned as pilot light (not illustrated), and is jetted into the combustor transition piece 53 as a combustion gas. At this time, a part of the combustion gas is jetted into the combustor transition piece 53 so as to be diffused around with flames, so that the pre-mixed gases flowing from the main combustion burners 55 into the combustor transition piece 53 are ignited and burned. Then, the combustion gas is sent to the turbine 13.

The plurality of combustors 12 is supported by an intermediate shaft cover (inner casing) 61. The intermediate shaft cover 61 is arranged in the combustor casing 41, and has a cylindrical shape along the direction of the shaft center O. The intermediate shaft cover 61 is configured from an upper casing (inner casing portion) 62 and a lower casing (inner casing portion) 63 forming a half split shape, and right and left outer peripheral flange portions 62a and 63a are closely in contact in the up and down direction and are integrally connected with a plurality of bolts 64.

Further, in the intermediate shaft cover 61, one end portion 61a and the other end portion 61b are connected with a plurality of struts 61c arranged in the peripheral direction at predetermined intervals. The one end portion 61a in the direction of the shaft center O extends to the compressor 11 side and is connected to the combustor casing 41, and the other end portion 61b extends to the turbine 13 side and supports the vanes 27. The intermediate shaft cover 61 includes a cooling manifold 61d, and cooling air supplied to the cooling manifold 61d is supplied into the vanes 27 through a cooling passage (not illustrated).

Then, an attaching bracket (illustration is omitted) extends outward from the one end portion 61a of the intermediate shaft cover 61. The combustors 12 each have the combustor basket 52 supported by the intermediate shaft cover 61 through the attaching bracket (illustration is omitted).

The combustor casing 41 and the one end portion 61a of the intermediate shaft cover 61 are fit with each other in a radial direction, and a fitting portion thereof is pressed and supported by a pressing support mechanism 71 in the direction of the shaft center O. Further, the combustor casing 41 and the one end portion 61a of the intermediate shaft cover 61 are movably supported by a centering mechanism 72 in the radial direction. A plurality of the pressing support mechanisms 71 and the centering mechanisms 72 is provided in nearly the same positions in the combustor casing 41 and the intermediate shaft cover 61 in the radial direction, at predetermined intervals in the peripheral direction.

In the pressing support mechanism 71, as illustrated in FIGS. 3 to 6, a portion to be fit 81 positioned on the shaft center O side with respect to positions at which the combustors 12 are attached and forming a recess shape is formed along the peripheral direction, so that an attaching portion 82 forming a ring shape is formed, in the combustor casing 41 (upper casing 42). Meanwhile, a fitting portion 83 forming a protrusion shape is formed in the one end portion 61a, and a step portion 83a is formed in the fitting portion 83, in the intermediate shaft cover 61. The portion to be fit 81 forming a recess shape opens to the shaft center O side in the radial direction, and the fitting portion 83 forming a protrusion shape faces outward in the radial direction.

The fitting portion 83 of the intermediate shaft cover 61 can be fit into the portion to be fit 81 of the combustor casing 41 with a predetermined space S therebetween. In this case, the combustor casing 41 is configured from the upper casing 42 and the lower casing 43, and the intermediate shaft cover 61 is configured from the upper casing 62 and the lower casing 63. Therefore, the assembling order is the lower casing 43, the lower casing 63, the upper casing 62, and the upper casing 42.

A through hole 84 is formed in the attaching portion 82 along the direction of the shaft center O in the combustor casing 41. Meanwhile, in the intermediate shaft cover 61, a screw hole 85 and a recess portion 86 are formed in the fitting portion 83. In this case, the screw hole 85 is formed on the attaching portion 82 side, and the recess portion 86 is formed on a side opposite to the attaching portion 82. The inner diameter of the recess portion 86 is set to be larger than the inner diameter of the screw hole 85. When the fitting portion 83 of the intermediate shaft cover 61 is fit into the portion to be fit 81 of the combustor casing 41, the through hole 84, the screw hole 85, and the recess portion 86 are concentrically positioned.

A support pad 87 includes a screw portion 87a and a pressing portion 87b. The screw portion 87a is formed on a base end portion side (the right side in FIG. 4), and the pressing portion 87b is formed on a tip end portion side (the left side in FIG. 4). In this case, the outer diameter of the pressing portion 87b is set to be larger than the outer diameter of the screw portion 87a. Of the support pad 87, the screw portion 87a can be screwed into the screw hole 85 of the fitting portion 83 of the intermediate shaft cover 61, and the pressing portion 87b can intrude into the recess portion 86 of the fitting portion 83 of the intermediate shaft cover 61. The screw portion 87a of the support pad 87 is screwed into the screw hole 85 from the recess portion 86 side.

A locking hole 87c is formed in a base end portion of the support pad 87. The locking hole 87c is a hole forming a hexagonal shape, and is set to have a predetermined depth. A locking portion T1 forming a hexagonal shape of a tool (for example, torque wrench) T (see FIG. 13) can be locked into the locking hole 87c of the support pad 87. When the support pad 87 is rotated by rotating the tool T, the support pad 87 can be moved in an axial direction of the screw hole 85.

Therefore, in a state where the screw portion 87a of the support pad 87 is screwed into the screw hole 85 of the intermediate shaft cover 61, and the pressing portion 87b intrudes in the recess portion 86, the fitting portion 83 of the intermediate shaft cover 61 is fit into the portion to be fit 81 of the combustor casing 41, and the attaching portion 82 comes in contact with the step portion 83a, and thus the positioning is performed. Here, when the locking portion T1 of the tool T is locked in the locking hole 87c through the through hole 84, and the support pad 87 is positively rotated with the tool T, the support pad 87 moves forward along the axial direction of the screw hole 85, the pressing portion 87b presses the portion to be fit 81 of the combustor casing 41, and the fitting portion 83 presses the attaching portion 82, so that the combustor casing 41 is pressed and supported against the intermediate shaft cover 61. On the other hand, when the support pad 87 is reversely rotated with the tool T, the support pad 87 moves backward along the axial direction of the screw hole 85, the pressing portion 87b is separated from the portion to be fit 81 of the combustor casing 41, and the fitting portion 83 is separated from the attaching portion 82, and thus the press support between the combustor casing 41 and the intermediate shaft cover 61 is cancelled.

Further, the pressing support mechanism 71 is provided with a rotation stop mechanism 73 that prevents rotation of the support pad 87. The rotation stop mechanism 73 includes a locking rod 91 as a locking member to be locked into the base end portion of the support pad 87, and a fixing plate 92, a fixing bolt 93, and a nut 94 as fixing members that fix the locking rod 91 to the combustor casing 41.

In the locking rod 91, a screw portion 91a is formed in a base end portion, a flange portion 91b that forms a ring shape is provided in an intermediate portion, and a locking portion 91c that forms a hexagonal shape is provided in a tip end portion. The flange portion 91b can be fit into the through hole 84 of the attaching portion 82 of the combustor casing 41, and the locking portion 91c can be locked into the locking hole 87c of the support pad 87. A first through hole 92a and a second through hole 92b are formed in the fixing plate 92, and the screw portion 91a of the locking rod 91 can penetrate the first through hole 92a. The fixing bolt 93 can penetrate the second through hole 92b of the fixing plate 92, and a screw portion 93a can be screwed into a screw hole 82a formed in the attaching portion 82 of the combustor casing 41. The nut 94 can be screwed with the screw portion 91a of the locking rod 91 that penetrates the first through hole 92a of the fixing plate 92.

Therefore, the rotation stop mechanism 73 prevents rotation of the support pad 87, in a state where the support pad 87 presses the portion to be fit 81 of the combustor casing 41 and the fitting portion 83 presses the attaching portion 82 to press and support the combustor casing 41 against the intermediate shaft cover 61. The locking portion 91c of the locking rod 91 is locked into the locking hole 87c of the support pad 87 through the through hole 84, and the flange portion 91b is fit into the through hole 84. Then, the screw portion 91a of the locking rod 91 is brought closely in contact with the attaching portion 82 of the combustor casing 41 so as to penetrate the first through hole 92a of the fixing plate 92, and the screw portion 93a of the fixing bolt 93 is screwed into the screw hole 82a of the attaching portion 82 through the second through hole 92b of the fixing plate 92, and the nut 94 is screwed into the screw portion 91a of the locking rod 91. Then, the locking rod 91 is fixed to the combustor casing 41, so that its rotation is restricted, and rotation of the support pad 87 locked with the locking rod 91 is also restricted.

Figure 7:
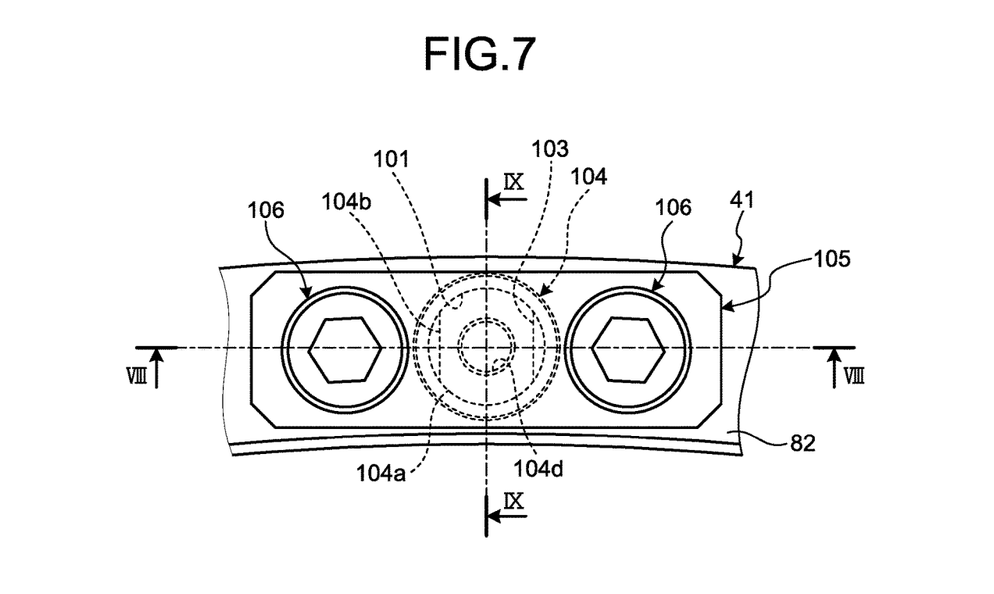
FIG. 7 is a front view illustrating a portion of the intermediate shaft cover attached with a centering pin.
Figure 8:
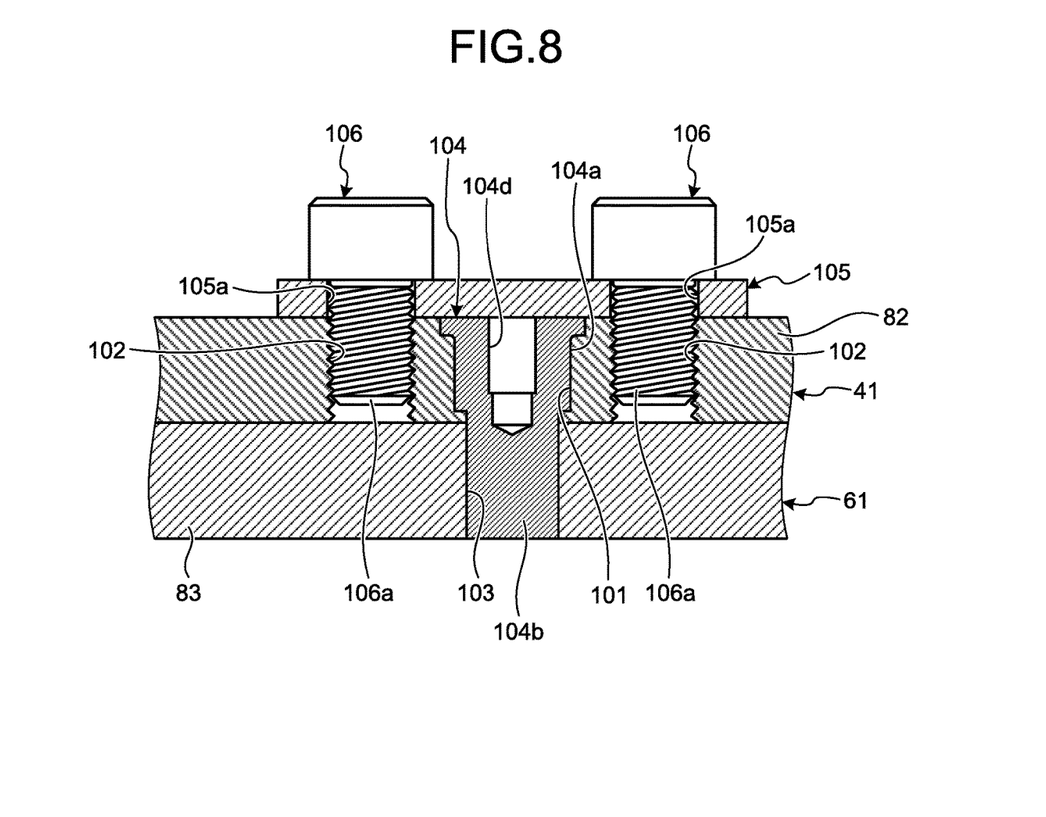
FIG. 8 is a VIII-VIII section view of FIG. 7, illustrating the portion of the intermediate shaft cover attached with the centering pin.
Figure 9:
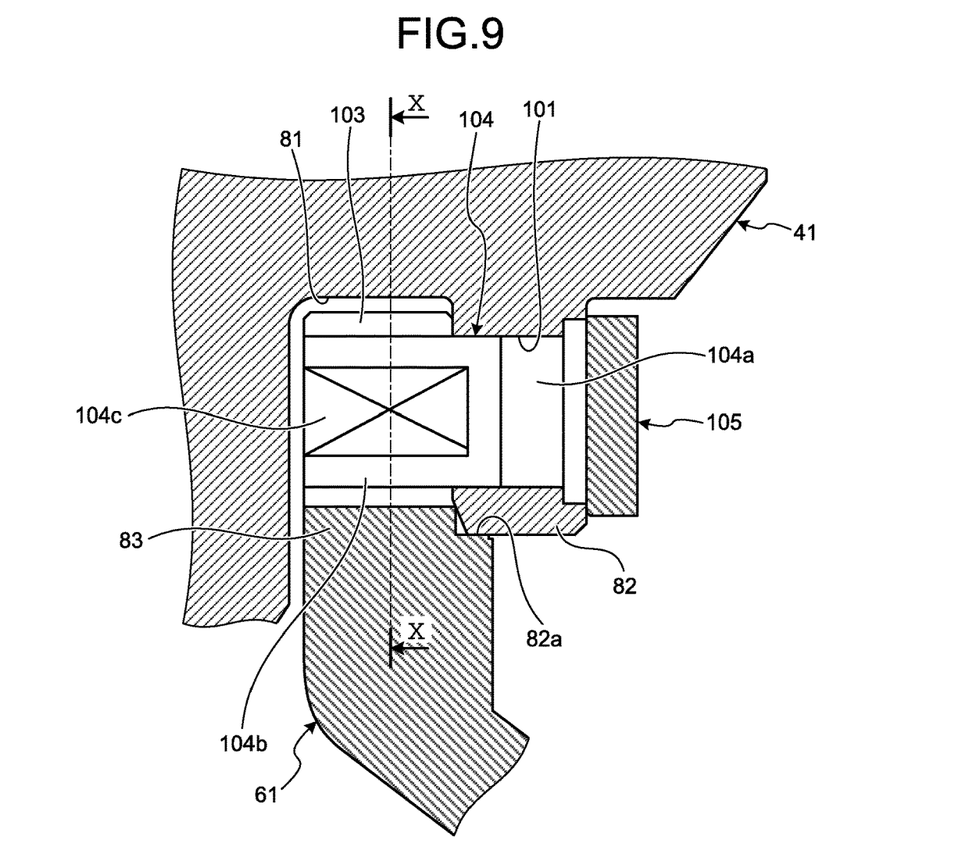
FIG. 9 is a IX-IX section view of FIG. 7, illustrating the portion of the intermediate shaft cover attached with the centering pin.
Figure 10:
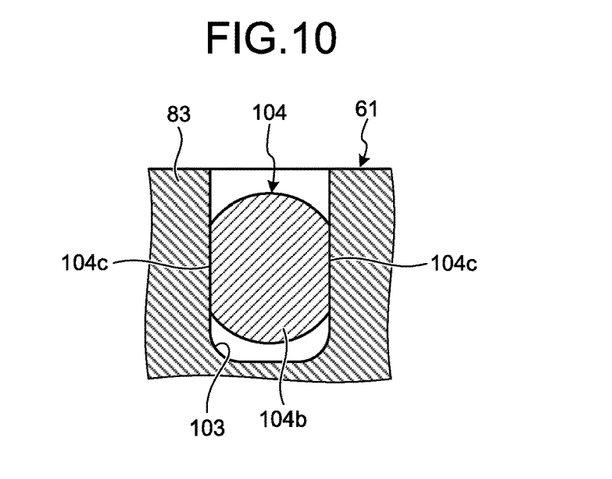
FIG. 10 is a X-X section view of FIG. 9.

FIG. 7 is a front view illustrating a portion of the intermediate shaft cover attached with a centering pin, FIG. 8 is a VIII-VIII section view of FIG. 7, illustrating the portion of the intermediate shaft cover attached with the centering pin, FIG. 9 is a IX-IX section view of FIG. 7, illustrating the portion of the intermediate shaft cover attached with the centering pin, and FIG. 10 is a X-X section view of FIG. 9.

The centering mechanism 72 is shown in FIG. 2. As illustrated in FIGS. 7 to 10, in the centering mechanism, the combustor casing 41 has a through hole 101 formed in the attaching portion 82 along the direction of the shaft center O and screw holes 102 respectively formed on both sides of the through hole 101 in the peripheral direction. Meanwhile, in the intermediate shaft cover 61, an engaging groove 103 is formed in the fitting portion 83. In this case, the through hole 101 of the attaching portion 82 is a circular hole, and the engaging groove 103 of the fitting portion 83 is a groove with a width narrower than the inner diameter of the through hole 101 and is open to an outer peripheral side of the fitting portion 83. When the fitting portion 83 of the intermediate shaft cover 61 is fit into the portion to be fit 81 of the combustor casing 41, the through hole 101 and the engaging groove 103 are positioned at the same position in the peripheral direction.

A centering pin 104 includes a column portion 104a and a guide portion 104b. The column portion 104a is formed on a base end portion side (the upper side in FIG. 8), and the guide portion 104b is formed on a tip end portion side (the lower side in FIG. 8). In this case, although the outer diameter of the column portion 104a and the maximum outer diameter of the guide portion 104b are the same, flat surfaces 104c parallel to each other are formed on an outer peripheral surface of the guide portion 104b, and thus the width of the guide portion 104b is set to be smaller than that of the column portion 104a. Of the centering pin 104, the column portion 104a can be fit into the through hole 101 of the attaching portion 82, and the guide portion 104b can be engaged with the engaging groove 103 of the fitting portion 83. In this case, the flat surfaces 104c of the guide portion 104b are in contact with both surfaces of the engaging groove 103. Further, a screw hole 104d is formed in a base end portion of the centering pin 104. When a tool (not illustrated) is screwed into the screw hole 104d, the centering pin 104 can be pulled out through the through hole 101 and the engaging groove 103 using the tool.

Two through holes 105a are formed in a fixing plate 105. When the fitting portion 83 of the intermediate shaft cover 61 is fit into the portion to be fit 81 of the combustor casing 41, the through holes 105a in the fixing plate 105 and the screw holes 102 in the attaching portion are concentrically positioned. Two fixing bolts 106 can penetrate the respective through holes 105a in the fixing plate 105, and screw portions 106a can be screwed into the screw holes 102 of the attaching portion 82.

Therefore, the centering pin 104 has the column portion 104a fit into the through hole 101 of the attaching portion 82 and the guide portion 104b engaged with the engaging groove 103 of the fitting portion 83, and the fixing plate 105 fixed to the attaching portion 82 with the fixing bolts 106 is closely in contact and is prevented from being dropped out. In this state, the centering pin 104 is fixed to the combustor casing 41 side, and the guide portion 104b is connected with the intermediate shaft cover 61 through the engaging groove 103. Here, the engaging groove 103 is provided along the radial direction of the combustor casing 41 and the intermediate shaft cover 61, and thus the combustor casing 41 and the intermediate shaft cover 61 can relatively move without central positions thereof being misaligned as a result of thermal elongation.

Figure 11:
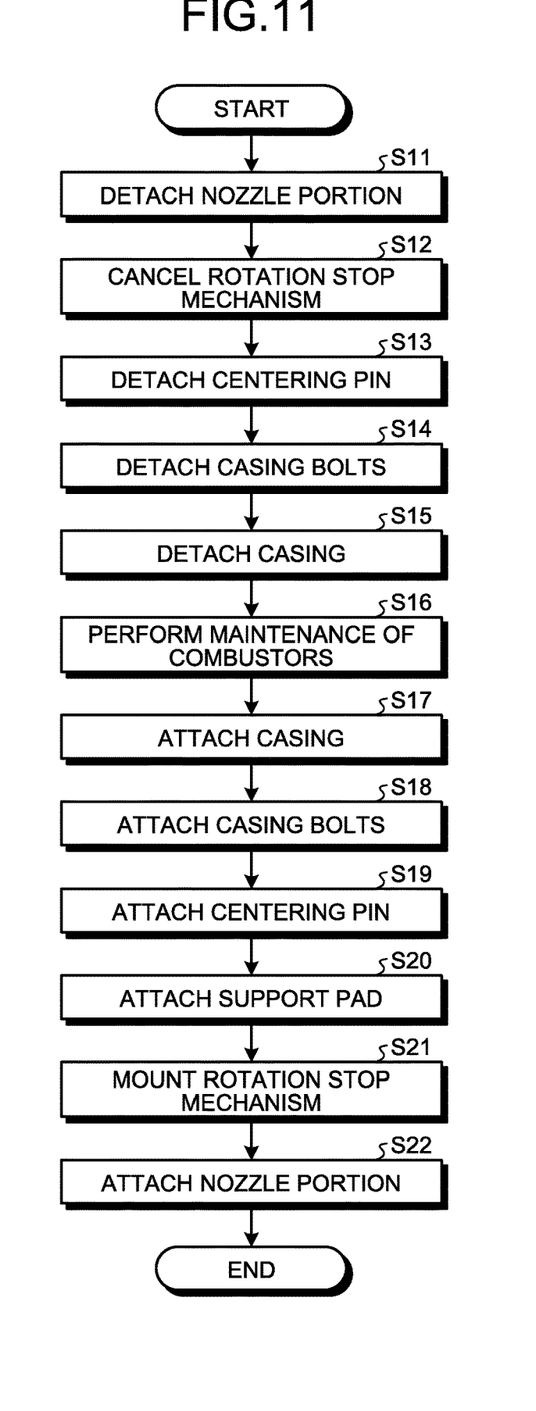
FIG. 11 is a flowchart illustrating a work procedure of a method of performing maintenance of a combustor.
Figure 12:
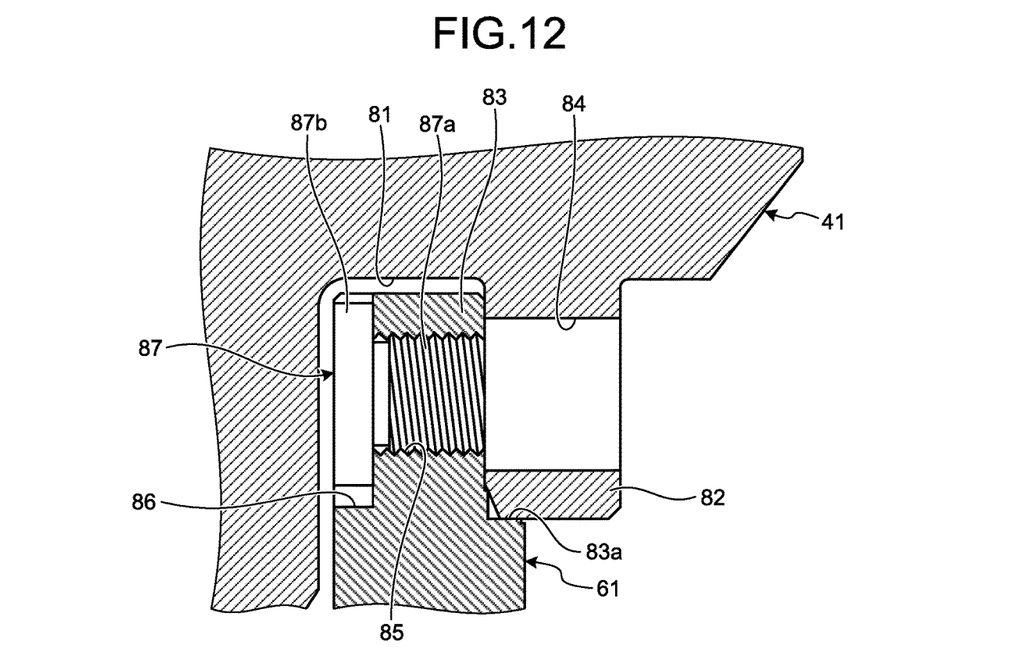
FIG. 12 is a schematic view illustrating a method of fixing the intermediate shaft cover with the support pad.
Figure 13:
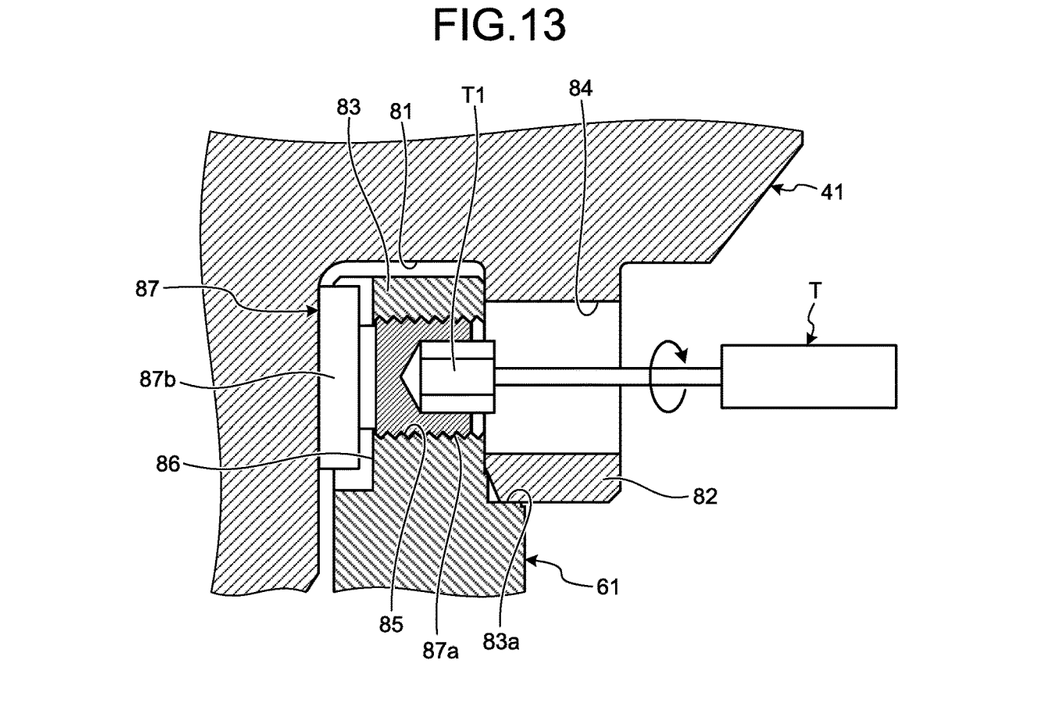
FIG. 13 is a schematic view illustrating a method of fixing the intermediate shaft cover with the support pad.

Here, a method of assembling a gas turbine of the present embodiment (a method of assembling a rotary machine) and a method of performing maintenance of a gas turbine (a method of performing maintenance of a rotary machine) will be described. FIG. 11 is a flowchart illustrating a work procedure of a method of performing maintenance of a combustor, and FIGS. 12 and 13 are schematic views illustrating a method of fixing the intermediate shaft cover with the support pad.

The method of assembling a gas turbine of the present embodiment includes a process of fitting the upper casing 42 of the combustor casing 41 to an end portion of the intermediate shaft cover 61 in the radial direction to cover the plurality of combustors 12, and a process of pressing and supporting the portion to be fit 81 of the combustor casing 41 and the fitting portion 83 of the intermediate shaft cover 61 in the shaft center direction of the rotor 32 by the support pad 87.

Further, the method of performing maintenance of a gas turbine of the present embodiment includes a process of cancelling fastening of the upper casing 42 of the combustor casing 41, a process of raising and detaching the upper casing 42 from the lower casing 43, a process of performing maintenance of the combustors 12, a process of fitting the upper casing 42 to the intermediate shaft cover 61 in the radial direction to cover the plurality of combustors 12, a process of pressing and supporting the upper casing 42 and the fitting portion 83 of the intermediate shaft cover 61 in the axial direction of the rotor 32 by the support pad 87, and a process of fastening the upper casing 42.

To specifically describe the method of performing maintenance of a gas turbine (the method of assembling a gas turbine), as illustrated in FIG. 11, in step S11, a nozzle portion of the combustors 12 is removed. The nozzle portion is the pilot combustion burner 54, the main combustion burners 55, the top hat portion 56, and the fuel ports 57, 58, and 59, as illustrated in FIG. 1. Referring back to FIG. 11, in step S12, the rotation stop mechanism 73 is cancelled. As illustrated in FIGS. 4 and 6, by the fixing bolt 93 being loosened and the nut 94 being loosened, the fixing plate 92 is detached, and the locking rod 91 is pulled out through the through hole 84. Then, the locking portion 91c of the locking rod 91 is detached from the locking hole 87c of the support pad 87, so that rotation stop of the support pad 87 is cancelled.

Note that, in a case where the fixing bolt 93 or the nut 94 has seized and cannot be loosened, a head portion of the fixing bolt 93 or the screw portion 91a (nut 94) of the locking rod 91 is cut with a cutting tool, so that the locking rod 91 can be pulled out through the through hole 84.

Referring back to FIG. 11, in step S13, the centering pin 104 is detached. As illustrated in FIG. 8, by the two fixing bolts 106 being loosened, the fixing plate 105 is detached from the attaching portion 82, a tool (not illustrated) is screwed into the screw hole 104d of the centering pin 104, and the centering pin 104 is pulled out through the through hole 101 and the engaging groove 103 through the tool. Referring back to FIG. 11, in step S14, the bolts 46 and 47 with which the combustor casing 41 (upper casing 42) is fixed are detached. As illustrated in FIG. 1, fastening between the upper casing 42 and the compressor casing 21 is cancelled by loosening the bolt 46, and fastening between the upper casing 42 and the turbine casing 26 is cancelled by loosening the bolt 47.

Referring back to FIG. 11, in step S15, the upper casing 42 is detached. As illustrated in FIG. 2, after the plurality of bolts 44 is loosened, the jack 45 is arranged between the notch portion 42b in the outer peripheral flange portion 42a of the upper casing 42 and the outer peripheral flange portion 43a of the lower casing 43. Then, the jack 45 is elongated, so that the upper casing 42 is raised from the lower casing 43, and the upper casing 42 and the lower casing 43 are separated. At this time, the upper casing 42 is pressed and supported against the intermediate shaft cover 61 by the support pad 87. Therefore, by providing a larger load than pressing and supporting force thereof with the jack 45, the upper casing 42 is separated from the lower casing 43.

Note that, after the upper casing 42 is detached, as illustrated in FIG. 13, the support pad 87 is reversely rotated with the tool T, and the support pad 87 is moved backward along the axial direction of the screw hole 85, and the pressing portion 87b is housed in the recess portion 86.

Referring back to FIG. 11, in step S16, maintenance work of the combustors 12 is performed. As illustrated in FIG. 1, when the upper casing 42 is detached from the lower casing 43, the plurality of combustors 12 is exposed. Therefore, the operator can perform the maintenance work of the combustors 12.

Referring back to FIG. 11, in step S17, the upper casing 42 is attached. As illustrated in FIGS. 2 and 12, the upper casing 42 is lowered and placed on the lower casing 43, the portion to be fit 81 is fit onto the fitting portion 83 of the intermediate shaft cover 61, and the plurality of bolts 44 is fastened. Referring back to FIG. 11, in step S18, the upper casing 42 is fixed with the bolts 46 and 47. As illustrated in FIG. 1, the upper casing 42 and the compressor casing 21 are fastened by fastening the bolt 46, and the upper casing 42 and the turbine casing 26 are fastened by fastening the bolt 47.

Referring back to FIG. 11, in step S19, the centering pin 104 is attached. As illustrated in FIG. 8, the column portion 104a of the centering pin 104 is fit into the through hole 101 of the attaching portion 82, and the guide portion 104b is engaged with the engaging groove 103 of the fitting portion 83. Then, the fixing plate 105 is brought closely in contact with the attaching portion 82, and the fixing plate 105 is fixed with the fixing bolts 106. Therefore, the combustor casing 41 and the intermediate shaft cover 61 are supported in a relatively movable manner without the central positions thereof being misaligned as a result of thermal elongation.

Referring back to FIG. 11, in step S20, the support pad 87 is attached. As illustrated in FIG. 13, the locking portion T1 of the tool T is locked into the locking hole 87c through the through hole 84, and the support pad 87 is positively rotated with the tool T. Then, the support pad 87 moves forward along the axial direction of the screw hole 85, and the pressing portion 87b presses the portion to be fit 81 of the combustor casing 41 and the fitting portion 83 presses the attaching portion 82. Therefore, the intermediate shaft cover 61 is pressed and supported against the combustor casing 41.

Referring back to FIG. 11, in step S21, the rotation stop mechanism 73 is mounted. As illustrated in FIG. 4, the locking portion 91c of the locking rod 91 is locked into the locking hole 87c of the support pad 87 through the through hole 84, and the flange portion 91b is fit into the through hole 84. Then, the fixing plate 92 is brought closely in contact with the attaching portion 82 such that the screw portion 91a of the locking rod 91 penetrates the first through hole 92a, the fixing plate 92 is fixed to the attaching portion 82 with the fixing bolt 93, and the nut 94 is fastened with the screw portion 91a of the locking rod 91. Therefore, the locking rod 91 is fixed to the combustor casing 41, so that its rotation is restricted, and the rotation of the support pad 87 locked with the locking rod 91 is also restricted.

Referring back to FIG. 11, in step S22, the nozzle portion is mounted. As illustrated in FIG. 1, the pilot combustion burner 54, the main combustion burners 55, the top hat portion 56, and the fuel ports 57, 58, and 59 are attached to the combustors 12. Here, the maintenance work of the combustor 12 is completed.

As described above, the rotary machine of the present embodiment is provided with the combustor casing 41 configured from the upper and lower casings 42 and 43 forming a half split shape, the intermediate shaft cover 61 configured from the upper and lower casings 62 and 63 forming a half split shape and supporting the combustors 12 in the combustor casing 41, and the pressing support mechanism 71 that presses and supports the portion to be fit 81 of the combustor casing 41 and the fitting portion 83 of the intermediate shaft cover 61 in the axial direction of the rotor 32.

Therefore, since the combustor casing 41 and the intermediate shaft cover 61 are pressed and supported by the pressing support mechanism 71 in the axial direction, no screw engaging portion exists between the combustor casing 41 and the intermediate shaft cover 61, and seizure of the screw portion can be avoided. Therefore, by simply cancelling the pressing between the combustor casing 41 and the intermediate shaft cover 61 by the pressing support mechanism 71, the upper casing 42 of the combustor casing 41 can be detached from the intermediate shaft cover 61. Further, even if the pressing between the combustor casing 41 and the intermediate shaft cover 61 by the pressing support mechanism 71 cannot be cancelled, the pressing between the upper casing 42 and the intermediate shaft cover 61 can be cancelled and the upper casing 42 can be detached by causing a load to act on the upper casing 42 outward in the radial direction. As a result, the detachment of the combustor casing 41 becomes easy, and the maintainability of the internal combustion chamber can be improved.

In the rotary machine of the present embodiment, as the pressing support mechanism 71, the support pad 87 that is screwed and engaged with the fitting portion 83 of the intermediate shaft cover 61 and presses the portion to be fit 81 of the upper casing 42 is provided. Therefore, by simply rotating the support pad 87, the press support between the upper casing 42 and the intermediate shaft cover 61 by the support pad 87 can be provided or the pressing therebetween can be cancelled, and workability of the assembling work and the disassembling work of the combustor casing 41 can be improved.

In the rotary machine of the present embodiment, the portion to be fit 81 of the upper casing 42 has the recess shape, the fitting portion 83 of the intermediate shaft cover 61 has the protrusion shape, and the support pad 87 is screwed and engaged with the fitting portion 83 of the intermediate shaft cover 61. Therefore, when the fitting portion 83 forming the protrusion shape of the intermediate shaft cover 61 is fit into the portion to be fit 81 forming the recess shape of the upper casing 42, the press support against the upper casing 42 can be provided or the pressing against the upper casing 42 can be cancelled by simply rotating the support pad 87, and the workability can be improved.

In the rotary machine of the present embodiment, the rotation stop mechanism 73 that prevents the rotation of the support pad 87 is provided. Therefore, after the support pad 87 is rotated, and the upper casing 42 and the intermediate shaft cover 61 are pressed and supported, the rotation of the support pad 87 is prevented by the rotation stop mechanism 73. Therefore, cancellation of the press support between the combustor casing 41 and the intermediate shaft cover 61 due to vibration or the like can be suppressed, and reliability can be improved.

In the rotary machine of the present embodiment, as the rotation stop mechanism 73, the locking rod 91 that is locked in the base end portion of the support pad 87, and the fixing plate 92, the fixing bolt 93, and the nut 94 that fix the locking rod 91 to the upper casing 42 are provided. Therefore, after the support pad 87 is rotated, and the upper casing 42 and the intermediate shaft cover 61 are pressed and supported, the locking rod 91 is locked into the base end portion of the support pad 87 and fixes the support pad 87 to the upper casing 42. Therefore, the rotation of the support pad 87 can be easily prevented with a simple configuration, and when the fixing bolt has seized, the locking rod 91 can be detached by cutting the fixing rod, and reliability can be improved.

In the rotary machine of the present embodiment, the centering mechanism 72 that supports the intermediate shaft cover 61 so as to be movable with respect to the combustor casing 41 in the radial direction is provided. Therefore, the intermediate shaft cover 61 is movable with respect to the combustor casing 41 in the radial direction by the centering mechanism 72. Therefore, even if thermal elongation of the combustor casing 41 and the intermediate shaft cover 61 occurs, the centers thereof are not misaligned, and the reliability of the machine can be improved.

Further, the method of assembling a gas turbine of the present embodiment includes the process of fitting the upper casing 42 of the combustor casing 41 to an end portion of the intermediate shaft cover 61 in the radial direction to cover the plurality of combustors 12, and the process of pressing and supporting the portion to be fit 81 of the combustor casing 41 and the fitting portion 83 of the intermediate shaft cover 61 in the shaft center direction of the rotor 32 by the support pad 87.

Therefore, since the upper casing 42 and the intermediate shaft cover 61 are pressed and supported in the shaft center direction by the support pad 87, the upper casing 42 can be detached from the intermediate shaft cover 61 by simply cancelling the pressing between the upper casing 42 and the intermediate shaft cover 61 by the support pad 87. Further, even if the pressing between the upper casing 42 and the intermediate shaft cover 61 by the support pad 87 cannot be cancelled, a load is brought to act on the upper casing 42 outward in the radial direction, so that the pressing between the upper casing 42 and the intermediate shaft cover 61 can be cancelled and the upper casing 42 can be detached. As a result, the detachment of the upper casing 42 becomes easy, and the maintainability of the combustors 12 can be improved.

In the method of assembling a gas turbine of the present embodiment, the support pad 87 is screwed and engaged with the fitting portion 83 of the intermediate shaft cover 61, and when the fitting portion 83 of the intermediate shaft cover 61 is fit into the portion to be fit 81 of the upper casing 42, the upper casing 42 and the intermediate shaft cover 61 are pressed by rotating the support pad 87. Therefore, by simply rotating the support pad 87, the press support between the upper casing 42 and the intermediate shaft cover 61 by the support pad 87 can be provided or the pressing therebetween can be cancelled, and the workability of the assembling work and the disassembling work of the upper casing 42 can be improved.

In the method of assembling a gas turbine of the present embodiment, after the upper casing 42 and the intermediate shaft cover 61 are pressed and supported by the support pad 87, the rotation of the support pad 87 with respect to the upper casing 42 and the intermediate shaft cover 61 is prevented. Therefore, cancellation of the press support between the upper casing 42 and the intermediate shaft cover 61 due to vibration and the like is suppressed, and the reliability can be improved.

Further, the method of performing maintenance of a gas turbine of the present embodiment includes the process of cancelling fastening of the upper casing 42 of the combustor casing 41, the process of raising and detaching the upper casing 42 from the lower casing 43, the process of performing maintenance of the combustors 12, the process of fitting the upper casing 42 onto the intermediate shaft cover 61 in the radial direction to cover the plurality of combustors 12, the process of pressing and supporting the fitting portion between the upper casing 42 and the intermediate shaft cover 61 in the axial direction of the rotor 32 by the support pad 87, and the process of fastening the upper casing 42.

Therefore, since the upper casing 42 and the intermediate shaft cover 61 are pressed and supported in the axial direction by the support pad 87, the upper casing 42 can be detached from the intermediate shaft cover 61 by simply cancelling the pressing between the upper casing 42 and the intermediate shaft cover 61 by the support pad 87. Further, even if the pressing between the upper casing 42 and the intermediate shaft cover 61 by the support pad 87 cannot be cancelled, the upper casing 42 can be detached by causing a load to act on the upper casing 42 outward in the radial direction. As a result, the detachment of the combustor casing 41 becomes easy, and the maintainability of the combustors 12 can be improved.

Note that, in the above-described embodiment, the support pad 87 is provided as the pressing support mechanism 71. However, the embodiment is not limited to this configuration. For example, the screw portion 87a and the pressing portion 87b are integrally formed in the support pad 87. However, the screw portion 87a and the pressing portion 87b may be integrally fixed as separate members. Further, the support pad 87 is provided on the intermediate shaft cover 61 side and presses the combustor casing 41 side. However, the support pad 87 may be provided on the combustor casing 41 side, and press the intermediate shaft cover 61 side.

Further, in the above-described embodiment, as the rotation stop mechanism 73, the locking hole 87c having a hexagonal shape of the support pad 87 is formed, and the locking portion 91c having a hexagonal shape of the locking rod 91 is locked therein. However, the shape is not limited to the hexagon, and other polygonal shapes, a cross shape, or a plurality of holes (protrusions) may be employed. Further, the fixing plate 92, the fixing bolt 93, and the nut 94 are provided as fixing members. However, the embodiment is not limited to this configuration, and any configuration can be employed as long as the locking member can be fixed in a non-rotatable manner.

Further, in the above-described embodiment, as a structure supported by an inner casing, the combustors 12 supported by the intermediate shaft cover 61 have been described. However, the embodiment is not limited to this relationship. Further, the rotary machine of the present invention applied to a gas turbine has been described. However, the rotary machine of the present invention can also be applied to other rotary machines, for example, a steam turbine.

REFERENCE SIGNS LIST

11 COMPRESSOR
12 COMBUSTOR (STRUCTURE)
13 TURBINE
14 CASING
21 COMPRESSOR CASING
23 VANE
24 BLADE
26 TURBINE CASING
32 ROTOR (ROTATING SHAFT)
41 COMBUSTOR CASING (OUTER CASING)
42 UPPER CASING
43 LOWER CASING
45 JACK
61 INTERMEDIATE SHAFT COVER (INNER CASING)
62 UPPER CASING
63 LOWER CASING
71 PRESSING SUPPORT MECHANISM
72 CENTERING MECHANISM
73 ROTATION STOP MECHANISM
81 PORTION TO BE FIT
82 ATTACHING PORTION
83 FITTING PORTION
84 THROUGH HOLE
85 SCREW HOLE
87 SUPPORT PAD
91 LOCKING ROD (LOCKING MEMBER)
92 FIXING PLATE (FIXING MEMBER)
93 FIXING BOLT (FIXING MEMBER)
94 NUT (FIXING MEMBER)
101 THROUGH HOLE
102 SCREW HOLE
103 ENGAGING GROOVE
104 CENTERING PIN
105 FIXING PLATE
106 FIXING BOLT

The invention claimed is:

1. A rotary machine in which a rotation body is rotatably supported in a casing, the rotary machine comprising:
   the casing, which is an outer casing configured from upper and lower outer casing portions defining a half split shape,
      wherein a recess defined on the inner circumference of the outer casing along a peripheral direction defines a radial-direction attaching portion and a radial-direction wall of the outer casing, which extend radially inward from the outer casing:
   an inner casing configured from upper and lower inner casing portions defining a half split shape, and positioned inside the outer casing,
      wherein a radially outward extending radial-direction fitting portion is defined in an end portion of the inner casing, and the inner casing and the outer casing are positioned such that the radial-direction fitting portion of the inner casing is between the radial-direction wall of the outer casing and the radial-direction attaching portion of the outer casing; and
   a pressing support mechanism including a support pad that is screwed and engaged with the radial-direction fitting portion of the inner casing,
      wherein the support pad is configured to press against the radial-direction wall in a shaft center direction of the rotation body in order to press and support the radial-direction fitting portion of the inner casing against the radial-direction attaching portion of the outer casing in an opposite shaft center direction of the rotation body.

2. The rotary machine according to claim 1, further comprising
   a rotation stop mechanism configured to prevent rotation of the support pad.

3. The rotary machine according to claim 2, further comprising
   a centering mechanism configured to support the inner casing so as to be movable with respect to the outer casing in a radial direction.

4. The rotary machine according to claim 2, wherein the rotation stop mechanism includes a locking member that is locked into a base end portion of the support pad, and a fixing member configured to fix the locking member to the outer casing.

5. The rotary machine according to claim 4, further comprising
   a centering mechanism configured to support the inner casing so as to be movable with respect to the outer casing in a radial direction.

6. The rotary machine according to claim 1, further comprising
   a centering mechanism configured to support the inner casing so as to be movable with respect to the outer casing in a radial direction.

7. The rotary machine according to claim 1, further comprising a circumferential step portion defined in the radial-direction fitting portion, wherein the radial-direction attaching portion is in contact with the step portion.

8. A method of assembling a rotary machine which:
a rotating shaft is rotatably supported, through a bearing, in an outer casing defining a shape split into upper and lower halves;
a recess is defined on the inner circumference of the outer casing along a peripheral direction so that a radial-direction wall and a radial-direction attaching portion, which both extend radially inward, are defined in the outer casing;
an inner casing is positioned inside the outer casing and on an outer peripheral side of the rotating shaft; and
a radially outward extending radial-direction fitting portion is defined in an end portion of the inner casing;
the method comprising:
fitting the upper half of the outer casing onto the end portion of the inner casino in a radially inward direction to cover a plurality of combustors such that the inner casing and the outer casing are positioned with the radial-direction fitting portion between the radial-direction wall and the radial-direction attaching portion; and
rotating a support pad that is screwed and engaged with the radial-direction fitting portion such that the support pad is pressing against the radial-direction wall in a shaft center direction of the rotating shaft and pressing and supporting the radial-direction fitting portion of the inner casing against the radial-direction attaching portion of the outer casing in an opposite shaft center direction of the rotating shaft.

9. The method according to claim 8, wherein,
after the upper half of the outer casing and the inner casing are pressed and supported by the support pad, rotation of the support pad with respect to the upper half of the outer casing and the inner casing is prevented.

10. The method according to claim 8, wherein a circumferential step portion is defined in the radial-direction fitting portion, and the radial-direction attaching portion is in contact with the step portion.

11. A method of performing maintenance of a rotary machine in which:
a rotating shaft is rotatably supported, through a bearing, in an outer casing defining a shape split into upper and lower halves
a recess is defined on the inner circumference of the outer casing along a peripheral direction so that a radial-direction wall and a radial-direction attaching portion, which both extend radially inward, are defined in the outer casing;
an inner casing is positioned inside the outer casing and on an outer peripheral side of the rotating shaft; and
a radially outward extending radial-direction fitting portion is defined in an end portion of the inner casing;
the method comprising:
cancelling fastening between the upper half of the outer casing and the lower half of the outer casing;
raising and detaching the upper half of the outer casing from the lower half of the outer casing;
performing maintenance of an inside of the outer casing;
fitting the upper half of the outer casing onto the end portion of the inner casing in a radially inward direction such that the inner casing and the outer casing are positioned with the radial-direction fitting portion between the radial-direction wall and the radial-direction attaching portion;
rotating a support pad that is screwed and engaged with the radial-direction fitting portion such that the support pad is pressing against the radial-direction wall in a shaft center direction of the rotating shaft and pressing and supporting the radial-direction fitting portion of the inner casing against the radial-direction attaching portion of the outer casing in an opposite shaft center direction of the rotating shaft; and
fastening the upper half of the outer casing to the lower half of the outer casing.

12. The method according to claim 11, wherein a circumferential step portion is defined in the radial-direction fitting portion, and the radial-direction attaching portion is in contact with the step portion.

* * * * *